United States Patent [19]
Wolfe

[11] 3,860,937
[45] Jan. 14, 1975

[54] SUBMERSIBLE CAMERA HOUSING AND OPERATING MECHANISM THEREFOR

[76] Inventor: Clifford Wolfe, 67 Brook St., Islip, N.Y. 11751

[22] Filed: Dec. 13, 1973

[21] Appl. No.: 424,627

[52] U.S. Cl. .................................................. 354/64
[51] Int. Cl. ........................................... G03b 17/08
[58] Field of Search ........ 95/11 W; 339/176 P, 153; 354/64

[56] References Cited
UNITED STATES PATENTS
1,303,464  5/1919  Davis .............................. 339/176 P
3,750,547  8/1973  Walthier et al. .................... 95/11 W FOREIGN PATENTS OR APPLICATIONS
198,123  8/1967  U.S.S.R. ............................ 95/11 W Primary Examiner—John M. Horan
Attorney, Agent, or Firm—Flynn & Frishauf

[57] ABSTRACT

A camera housing, particularly for use in underwater photography and for use with electrically operated cameras, such as movie cameras includes a sealed housing having an electrically operated camera mounted therein. Outside of the housing a movable magnet is located so as to be in selective communication with a magnetically operated switching device which is located within the housing and which is connected in the electrical circuit of the camera. The operating mechanism, including the magnet outside of the housing and the magnetically operated switch inside the housing, does not penetrate the housing and provides simple and reliable control of the camera. The switching device inside the housing includes an isolation means which is directly connectible in the electrical operating circuit of the camera so as to render the camera normally inoperative, and the isolating circuit is connected to the magnetically operated switch to short same out to thereby close the electrical circuit and to render the camera operative. Simplified housing seal arrangements are also disclosed.

13 Claims, 9 Drawing Figures

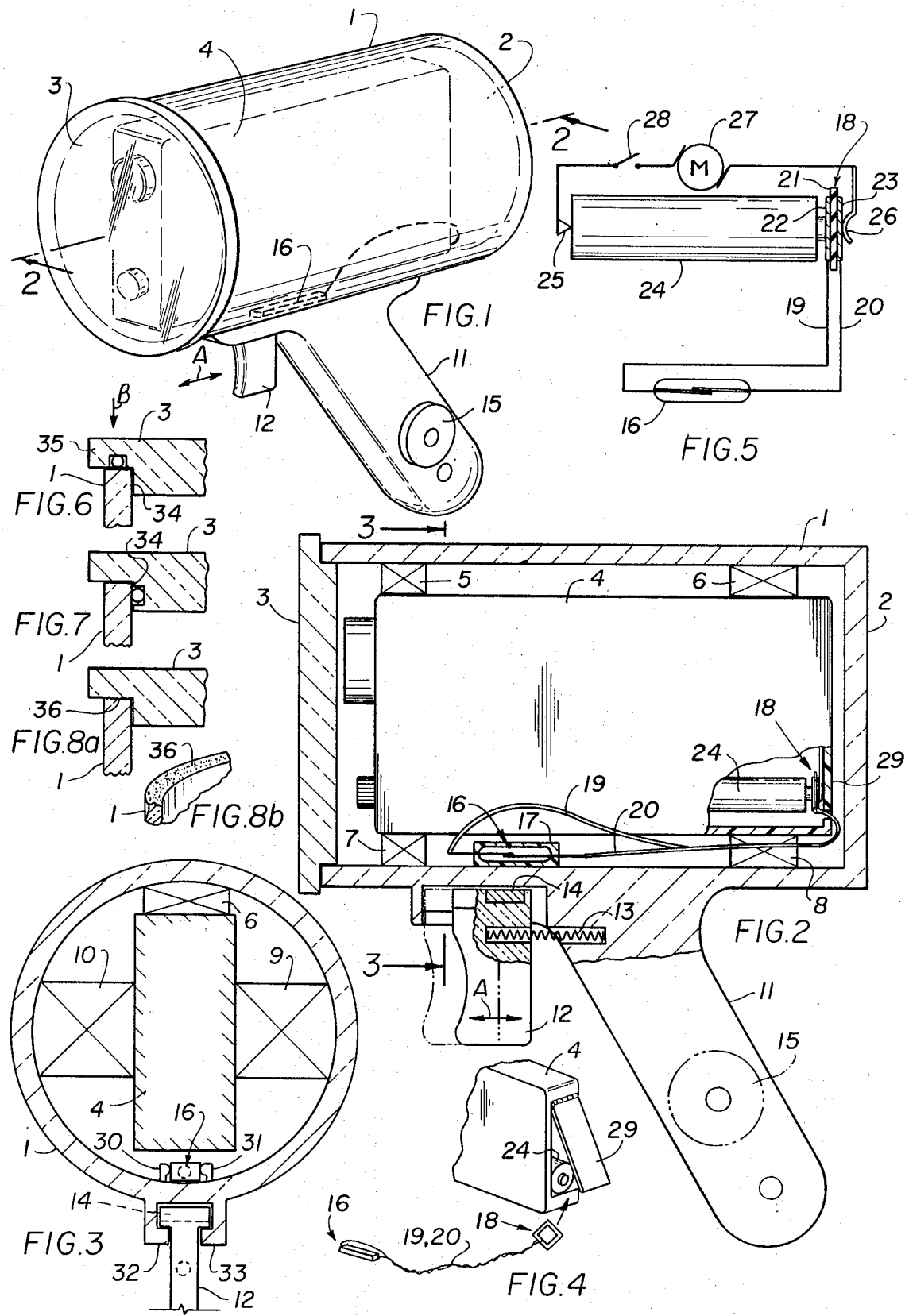

3,860,937

SUBMERSIBLE CAMERA HOUSING AND OPERATING MECHANISM THEREFOR

This invention relates to underwater photography, and more particularly to an underwater camera housing and operating mechanism.

The present invention is particularly suitable for use with motion picture cameras and the invention is described herewith in connection with same. However, the concepts described and claimed herein are generally applicable to certain types of still picture cameras which may be electrically operated.

Camera housings for underwater photography are generally well known in the art. However, the known housings are generally of a complex nature and have mechanical couplings passing through the walls of the housing for operating the camera contained within the housing. Also, the known camera housings generally have complex structures in order to provide liquid tight seals between the openable portions of the housing. The above-described mechanisms render the known underwater camera housings relatively expensive, complex and difficult to use. Moreover, due to the mechanical couplings passing through the housings, the reliability of the liquid tight seals become reduced with age. Still further, by virtue of the use of mechanical structures for operating the camera, the adaptability of the known devices to different types of cameras is limited.

The main object of the present invention is to provide an improved camera housing of simple construction, which is relatively inexpensive to fabricate, which provides highly reliable liquid tight seals and which includes an operating mechanism which does not penetrate a wall of the housing.

SUMMARY OF THE INVENTION

The camera housing according to the present invention comprises a magnetically operated switching element located within the housing and adapted to be connected in the electrical circuit of the camera which is to be placed within the housing. Outside of the housing is located a magnet which is movable into communication with the magnetically operated switching device within the housing for actuating the magnetically operated switching device. The housing is fabricated of material through which the magnetic fields produced by the magnet located outside the housing can easily pass through so as to act on the switching device inside of the housing.

Further, in accordance with the present invention, the housing includes simplified seal arrangements which render the housing inexpensive to fabricate and which provides reliable liquid tight seals.

BRIEF DESCRIPTION OF THE DRAWINGS

FIG. 1 is a perspective view showing a typical housing according to the present invention containing a motion picture camera therein;

FIG. 2 is a cross-sectional view of the arrangement of FIG. 1 along the line 2—2;

FIG. 3 is a cross-sectional view of the arrangement illustrated in FIG. 2 taken along the line 3—3;

FIG. 4 is a partial view of a motion picture camera showing how the switching device of the present invention is installed therein;

FIG. 5 illustrates how the switching device is electrically connected in the camera;

FIG. 6 illustrates a sealing arrangement of the cover of the housing of the present invention;

FIG. 7 illustrates another sealing arrangement of the cover of the housing; and

FIG. 8 illustrates still another sealing arrangement of the cover of the housing.

DETAILED DESCRIPTION OF ILLUSTRATED EMBODIMENTS

Referring to FIG. 1, a typical camera housing according to the present invention is comprised of a generally cylindrical tubular housing 1 having a rear end 2 preferably molded or otherwise bonded to the tubular member 1. The front end of the housing 3 is removably attached to the tubular member 1 by means illustrated in FIGS. 6–8 and which are described hereinbelow. A camera 4 is mounted within the housing by means of, for example, block supports 5–10 illustrated in FIGS. 2 and 3. It should be clear that any type of camera can be used, and that the block supports 5–10 must be appropriately dimensioned to properly support the particular camera used. The camera 4 is a movie camera, but other electrically operated cameras could also be used.

Attached to the lower portion of the tubular housing 1 is a handle member 11 which may be integrally formed with the tubular portion 1. The handle 11 contains a trigger member 12 which is forwardly biased by means of a spring 13. The trigger 12 has a magnet 14 at the upper end thereof which is slideable in the directions of the arrow A illustrated in FIGS. 1 and 2. The handle 11 preferably includes a removable weight 15 which is optionally used in order to provide proper buoyancy of the apparatus of the present invention when used under water.

Fixedly secured to the lower portion of the tubular member 1, and in selective registration with the magnet 14, is a magnetic switch 16, such as a well known type of reed switch or reed relay. Preferably, the magnetic switch 16 is encapsulated in a plastic housing 17 in order to protect same during use and in order to provide a convenient means for securing same to the tubular member 1. When the magnet 14 is moved in proximity of the magnetic switch 16 by movement of the trigger 12, the magnetic switch is actuated (i.e., turned of). When the magnet is moved out of proximity of the magnetic switch, it is deactivated (i.e., turned off).

The magnetic switch 16 is electrically coupled in series with the motor circuit of the camera by means of a contact assembly 18 and lead wires 19 and 20. The contact assembly, as best seen in FIG. 5, comprises a central insulator member 21 and conductors 22 and 23 respectively located on either side of insulator 21. The contact assembly is made relatively thin so that it fits between the battery and one of the battery contact clips of the camera, as shown schematically in FIG. 5 and as shown physically in FIGS. 2 and 4. As schematically shown in FIG. 5, the battery 24 is connected by means of battery contacts 25 and 26 to a motor 27 of the camera. The operating switch 28 of the camera is electrically connected to operatively control the motor 27 as illustrated, for example, in FIG. 5. In order to use the apparatus of the present invention, the contact assembly 18 is located between one of the battery terminals and one of the battery contacts 26, and the camera switch 28 is locked to its on position. In most cameras, a lock is provided for the operating switch. However, in cameras not having such a lock, the switch may be electrically wired so as to be "on" or external locking means may be provided for the camera, depending upon the particular camera being used. When connected as shown in FIG. 5, when the magnet 14 is moved in proximity of the magnetic switch 16, the contacts of the magnetic switch "close," thus completing the motor circuit and causing the camera to operate to take pictures. When the magnetic switch is deactivated by movement of the magnet 14 out of proximity of the magnetic switch 16, the electrical circuit is broken by means of the magnetic switch contacts coming out of electrical contact with each other, thereby deactivating the camera. Effectively, the contact assembly and magnetic switch combination of the present invention replaces the function of the on-off switch of the camera and provides an efficient and convenient remote control means for operating the camera.

The contact assembly 18 is made thin enough so that it fits between the battery and the battery contact 26 without difficulty. A typical camera is shown in FIG. 4 having a rear door 29 which is openable to expose the battery 24. The contact assembly 18 is located in position and the rear door 29 is closed, thereby positively installing the contact assembly between the battery 24 and the battery contact 26 which is on the inside of the door 29 and is not seen in FIG. 4. The lead wires 19, 20 are then merely passed out of the camera through the crack or space between the rear door 29 and the housing of the camera 4 as illustrated in FIG. 2. If the opening between the rear door 29 and the camera housing is insufficient, a small notch can be cut in the rear door or in the housing to allow passage of the wires out of the camera. While the installation shown in FIGS. 2 and 4 is for a particular camera, other cameras are equally usable, as should be apparent to those ordinarily skilled in the art.

As shown in FIG. 3, a clip comprising members 30 and 31 may be provided for retaining the magnetic switch 16 in position, while allowing said switch to be removed for servicing if required. The clips 30 and 31 preferably retain the switch 16 by frictional engagement.

FIG. 3 also illustrates a typical trigger configuration wherein engaging members 32 and 33 are provided to slideably retain the trigger 12 therein. The upper part of the trigger 12 is generally T-shaped and the lower parts of retaining members 32 and 33 have inwardly extending portions which engage the T-shaped portion of the trigger in a slideable manner. A front retaining portion is provided to prevent the trigger 12 from sliding out of the members 32 and 33. If desired, mechanical locking arrangements, which are well known, may be provided to selectively lock the trigger 12 in either its on or off position.

FIGS. 6–8 illustrate improved sealing arrangements according to the present invention. The front members 3 are precisely machined members which have a relatively close mechanical fit with the front end of the tubular member 1. In the embodiments of FIGS. 6–8, the end of the front member 3 has a stepped configuration having a bearing surface 34 and a radially extending portion 35 which is of smaller thickness than the remainder of the front member 3. The portion 35, as illustrated in FIG. 6 includes an O-ring sealing member embedded therein which engages the end surface of tubular member 1 in order to provide a liquid tight seal. Silicon grease is preferably used between abutting surfaces of the tubular member 1 and the front member 3. The ends of portion 35 extend radially of the tubular member 1 to facilitate removal of front member 3.

In FIG. 6, when the camera housing is under water, the pressure acting on the front member 3 acts to further enhance the sealing characteristics of the sealing arrangement. By virtue of the pressure acting in the direction of the arrow B in FIG. 6, more pressure is applied against the O-ring, thereby enhancing the seal.

As shown in FIG. 7, the surface 34 has a recess therein for retaining an O-ring seal which abuts against the flat surface of the tubular member 1 when engaged with the front portion 3. Again, the abutting surfaces preferably have silicon grease therebetween so as to improve the seal.

FIG. 8 shows an improved construction whereby no O-rings at all are used to obtain the seal. In this embodiment, the parts are fabricated with close tolerances and silicon grease is used between abutting surfaces. In order to improve the sealing characteristics, the abutting surfaces are preferably rough-hewed in a random manner. The silicon grease between the abutting rough-hewed surfaces provides a still better liquid tight seal than is obtainable with smooth surfaces. A typical rough-hewed surface is surface 36 shown in FIG. 8b.

While the invention has been described above with respect to particular apparatus, it should be clear that numerous modifications may be made thereto within the present inventive concept. For example, the housing can be made in substantially any shape, and substantially any camera can be used as long as the camera is electrically operated. The contact assembly can be fabricated using various types of materials. Preferably, the insulator 21 is a fiber-type insulation board, plastic or any other material having sufficient insulating properties while also being of sufficient mechanical strength so as to have a great degree of mechanical integrity. The conductors may be metal sheet-like material secured to the insulator, or may be conducting layers deposited on the insulating substrate 21 by means of any type of deposition technique, which are well known in the art. Also, it should be clear that the contact assembly of the present invention may take any convenient shape and may be tailored for particular types of cameras as desired, and if necessary, depending upon the particular camera constructions. The magnetic operating element 14 may be otherwise mounted for selective magnetic communication with the magnetic switch 16 than by means of a trigger 12. In the case where a trigger 12 is provided, a locking mechanism, as is well known in the art, can be used to lock the trigger in the operative position for long periods of picture taking, or to lock the trigger in the inoperative position for safety.

Various other modifications can be made within the scope of the appended claims.

I claim:
1. A camera housing comprising:
   means forming a sealed chamber and adapted to receive a battery operated camera therein, the camera having at least one battery terminal adapted to be electrically connected to a battery;
   switching means inside said chamber in nonpenetrating relationship with said housing and adapted to be connected in the electrical operating circuit of the camera for selectively opening and closing the electrical circuit of said camera to thereby selectively operate said camera, said switching means comprising:

isolating means directly connectable in the electrical operating circuit of the camera between the battery and said at least one battery terminal; and a magnetically operated switch mounted on a wall of said chamber and coupled to said isolating means via flexible lead wires for selectively shorting out said isolating means to close the electrical circuit of said camera; and magnetic means located outside of said chamber and adapted to be located in selective magnetic communication with said magnetically operated switch, without physically penetrating through said chamber, to close said magnetically operated switch and short out said isolating means, thereby operating said camera, said magnetic means comprising:

a trigger member carring a permanent magnet adjacent an outer surface of said chamber, said trigger member being selectively operable to slide said permanent magnet along said outer surface of said chamber between a first "inoperative" position spaced in the direction of sliding movement thereof out of magnetic communication with said magnetically operated switch and a second "operative" position wherein said permanent magnet is located opposite from and in registration with said magnetically operated switch with a wall of said chamber interposed therebetween so as to be in magnetic communication with said magnetically operated switch to thereby close said magnetically operated switch; and means biasing said trigger member toward said second "inoperative" position of said permanent magnet.

2. A camera housing according to claim 1 wherein said camera is battery operated and wherein said isolating means is connectable between the battery of said camera and the battery terminal of said camera.

3. A camera housing according to claim 1 wherein said isolating means is substantially wafer-shaped and comprises an isolating layer having conductive layers on either side thereof, said conducting layers being isolated from each other, one of said conducting layers being adapted to contact a terminal of said battery, and the other of said conducting layers adapted to contact said at least one battery terminal of said camera; and wherein said flexible lead wires connect said conducting layers to respective terminals of said magnetically operated switch.

4. A camera housing according to claim 1 wherein said sealed chamber comprises a removable portion for enabling a camera to be placed in and out of said housing.

5. A camera housing according to claim 4 wherein said housing has a stepped recess formed therein and said removable cover is sealingly received in said stepped recess.

6. A camera housing according to claim 5 comprising a sealing ring in the surface of said stepped portion of said housing for sealingly contacting the peripheral wall of said removable cover.

7. A camera housing according to claim 5 wherein at least one of said stepped portion of said housing and the surface of said removable cover is rough-hewed and comprising a sealing fluid on said rough-hewed surface.

8. A camera housing according to claim 7 wherein said sealing fluid is silicon grease.

9. A camera housing according to claim 7 wherein both said stepped portion of said housing and said removable cover include rough-hewed surfaces which face each other when said housing is sealed.

10. A camera housing according to claim 9 comprising a silicon grease layer interposed between said rough-hewed surfaces.

11. A camera housing according to claim 5 wherein said removable cover is a flat cover, said housing comprising a sealing ring in the surface of said stepped portion of said housing for sealingly contacting the peripheral portion of the flat surface of said removable cover.

12. A camera housing according to claim 1, including means for slideably mounting said trigger member for slidable movement along said outer surface of said chamber.

13. A camera housing according to claim 1 including clip means inside said chamber for releasably mounting said magnetically operated switch to said chamber wall.

* * * * *

UNITED STATES PATENT OFFICE
CERTIFICATE OF CORRECTION

Patent No. 3,860,937　　　　　　　　　Dated January 14, 1975

Inventor(s) Clifford Wolff

It is certified that error appears in the above-identified patent and that said Letters Patent are hereby corrected as shown below:

In the heading of the patent, change the inventor's name to:

--Clifford Wolff--.

Signed and sealed this 8th day of April 1975.

(SEAL)
Attest:

RUTH C. MASON
Attesting Officer

C. MARSHALL DANN
Commissioner of Patents
and Trademarks